Jan. 8, 1946.  J. G. SISSON  2,392,617
CYLINDRICAL TEST GAUGE
Filed March 20, 1944
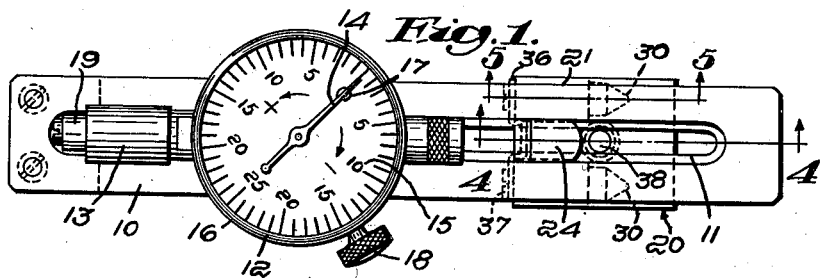
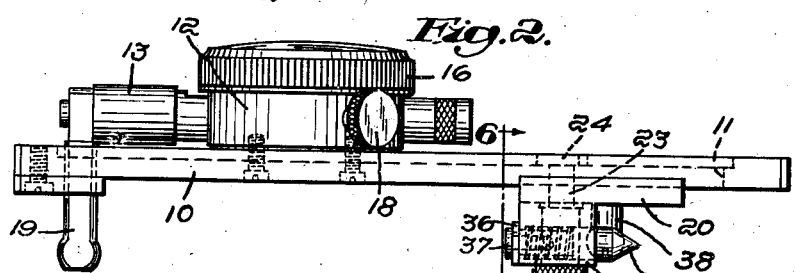
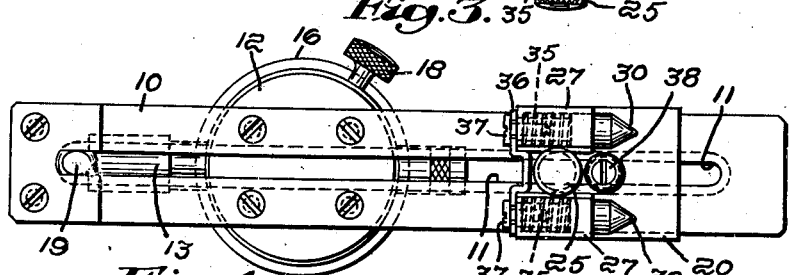
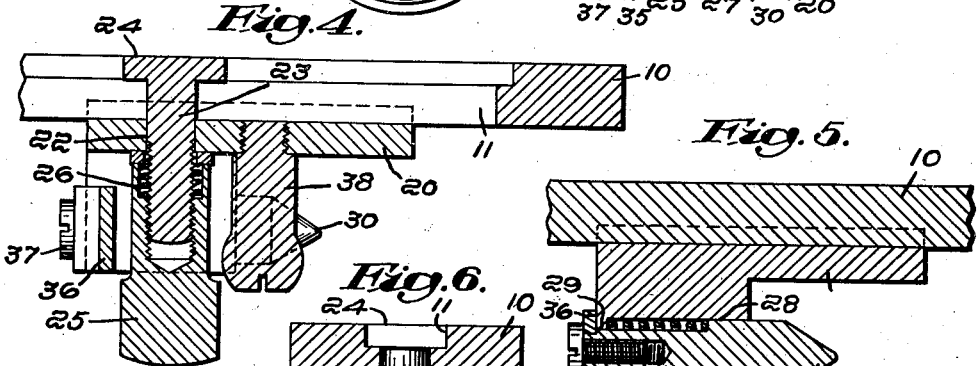
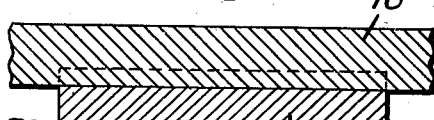
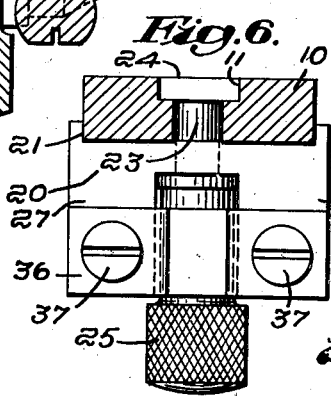
Inventor:
James G. Sisson,
By Spear, Rawlings & Spear
Attorneys Patented Jan. 8, 1946

2,392,617

UNITED STATES PATENT OFFICE 2,392,617

CYLINDRICAL TEST GAUGE

James G. Sisson, Athol, Mass., assignor to The L. S. Starrett Company, Athol, Mass., a corporation of Massachusetts Application March 20, 1944, Serial No. 527,263

4 Claims. (Cl. 33—178)

The present invention involves improvements in gauges for testing cylindrical surfaces. Surfaces, of which ball-bearing races, connecting rod bearings, or the like, are good examples of parts which, in manufacture or by use, depart from their intended radius of design, and the demand is for an accurate and easily operated gauge by which the variations in such surfaces can be readily measured so that, for example, the amount of enlargement in re-boring or for re-lining may be readily determined.

The use of a gauge on similar principles for testing engine cylinders, as in Letters Patent to Simpson No. 1,847,906, March 1, 1932, has demonstrated the efficiency of the three-point basis of such gauging which goes back to July 1, 1919, as is shown in Letters Patent to Bellard No. 1,308,324.

The present gauge is a further response to the demand indicated in Letters Patent to Blomstrom No. 2,087,896. This gauge was quite successful but lacked the handiness so necessary to the mechanic's efficiency in accurately and rapidly testing different kinds of parts or work where close tolerances are essential.

A gauge in accordance with my invention comprises a base having a longitudinal slot therethrough which supports a plunger-operated indicator having a finger extending through the slot adjacent one of its ends. A slide supporting a contact and a pair of laterally spaced spring-pressed plungers is carried by the base to move from a position adjacent the contact finger towards a position adjacent the other end of the base, and I provide means to clamp the slide to the base so that the surface contacting means carried by the slide and the indicator operating finger establish points for engagement with diametrically opposite zones of cylindrical surfaces. By this construction I am able to provide a gauge inexpensive to manufacture, well adapted for speedy and accurate use in determining the cylindricities of a wide range of surfaces.

As illustrative embodiments of the present invention, the accompanying drawing shows a practical example of a gauge to measure the out-of-roundness of inside cylindrical surfaces.

In the drawing:

Fig. 1 is a plan view of a gauge in accordance with my present invention.

Fig. 2 is a side elevation of the same.

Fig. 3 shows a bottom view of the gauge.

Fig. 4 is a section on the line 4—4, of Fig. 1, looking in the direction of the arrows.

Fig. 5 is a section on the line 5—5, of Fig. 1, and Fig. 6 shows a view of the slide lock partly sectioned on the line 6—6, of Fig. 2, looking in the direction of the arrows.

In the gauge shown in the drawing, I have shown a flat base 10 having straight parallel sides and a longitudinal shouldered slot 11. Attached to the base 10 is an indicator 12, preferably of the dial type, having a plunger 13 adapted to actuate the hand 14 so that it may be read with reference to the dial 15. The dial indicator shown has a bezel 16 by which the zero marking 17 of the dial 15 may be adjusted when the set screw 18 is released.

In accordance with my invention, I attach to the plunger 13 a contact finger 19 fitting the slot 11 and extending through it adjacent one end thereof.

At 20 I have indicated a slide milled as at 21 to receive the base 10 to be slidably guided thereby. The slide 20 has an aperture 22 to receive the bolt 23, the flattened head 24 of which is shaped to fit the slideway established by the shouldered slot 11 so that the head 24 is flush with the upper surface of the base 10 and is held against rotation. A knurled lock nut 25 is formed to receive a coiled spring 26 which rests against the slide 20. By this construction, the slide may be freely moved from a position adjacent the finger 19 to the opposite end of the slot 11 and locked in any desired position by tightening the lock nut 25.

Preferably I form the slide 20 to establish laterally of the aperture 22 a pair of mounts 27 each having a longitudinal bore 28 of reduced diameter adjacent its rear end to define a shoulder 29. Each of the bores 28 receives a contact plunger 30 the diameter of which is reduced as at 31 and 32 to establish shoulders 33 and 34. A spring 35 is seated against each of the shoulders 29 and 33 so that the contact plungers 30 are always urged towards the surface to be tested.

The contact plungers 30 are interconnected by a strap 36 seated against the shoulders 34 by screws 37 threaded into the rear ends of the contact plungers. Between the spring-pressed contact plungers I provide a short contact pin 38 threaded into the slide 20.

By this construction the finger 19 and the contact 38 are held in a true diametrical position to permit the cylindricity of an object to be quickly and accurately tested. In use, as for example, in testing the cylindricity of connecting rod bearings or bushings, the work is applied to the feeler points of the gauge (finger 19 and contact plungers 30) which have been roughly positioned for the diameter of the cylindrical part to be tested. As the work is progressed circumferentially or depthwise, the dial indicator shows the deviation from the true circle to enable the workman to determine how much enlargement is needed for the boring tool to accommodate a liner of correct diameter. I am thus able to provide an efficient and easily operated gauge adapted for use in testing cylindricity.

Various designs or combinations may and will doubtless be made, without departing from the spirit of the present improvements, to meet new needs and requirements as they arise.

What I therefore claim and desire to secure by Letters Patent is:

1. A gauge comprising a base having parallel sides and a shouldered slot, an indicator mounted on said base and having an operating plunger, a contact finger carried by said plunger and extending through said slot adjacent one of the ends thereof, a slide formed to be slidably guided by said base, said slide having an aperture therethrough, a headed bolt slidably seated and supported in said shouldered slot and extending through the aperture in said slide, a locking cap threaded on said bolt, and a spring housed within and seated by said cap against said slide, a contact member carried by said slide, and a pair of spaced spring-pressed plungers carried by said slide to position said contact finger and said contact member diametrically with respect to the cylindrical surfaces to be tested.

2. A gauge comprising a base having a slot, an indicator mounted on said base, a plunger to operate said indicator, a contact finger depending from said plunger and extending through said slot adjacent one end thereof, a slide adjustable along said base relative to said contact finger, means to lock said slide to said base, a second contact depending from said slide and disposed to occupy a position substantially parallel to said contact finger, and a pair of spaced spring-pressed plungers extending forwardly of said slide on either side of said second contact to hold the gauge diametrically of the cylindrical surface to be tested.

3. A gauge comprising a base, a first surface-engaging contact comprising a depending contact finger and an indicator having an operating plunger from which said finger depends, a second surface-engaging contact supported by said base and comprising a slide adjustable along said base, a contact member depending from said slide and disposed to occupy a position substantially parallel to said contact finger and a pair of spaced spring-pressed plungers extending forwardly of said slide on either side of said contact member, one of said surface-engaging contacts being adjustable relative to the other for cylindrical surfaces of different diameters.

4. A gauge comprising a base having a slot, an indicator mounted on said base and having an operating plunger, a contact finger carried by said plunger and extending through said slot adjacent one end thereof, a slide adjustable along said base relative to said contact finger and having a pair of shouldered bores, means to lock said slide to said base, a contact member carried by said slide, a pair of spaced spring-pressed contact plungers carried by said slide at either side of said contact member and each formed with a pair of shoulders, a spring seated between one of said last-named shoulders and the shoulders in the bore, and a connecting link seated on the other shoulders of said spring-pressed plungers and locked thereto.

JAMES G. SISSON.